(12) United States Patent
Brooks

(10) Patent No.: US 10,452,139 B2
(45) Date of Patent: *Oct. 22, 2019

(54) PERSPECTIVE OR GAZE BASED VISUAL IDENTIFICATION AND LOCATION SYSTEM

(71) Applicant: Robert C. Brooks, Royal Oak, MI (US)

(72) Inventor: Robert C. Brooks, Royal Oak, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/026,888

(22) Filed: Jul. 3, 2018

(65) Prior Publication Data

US 2018/0321741 A1 Nov. 8, 2018

Related U.S. Application Data

(63) Continuation of application No. 15/724,294, filed on Oct. 4, 2017, now Pat. No. 10,048,753.

(60) Provisional application No. 62/487,564, filed on Apr. 20, 2017.

(51) Int. Cl.
*G06F 3/01* (2006.01)
*G02B 27/06* (2006.01)
*G06T 11/60* (2006.01)
*G02B 27/01* (2006.01)
*G06T 19/00* (2011.01)
*G06F 3/0481* (2013.01)

(52) U.S. Cl.
CPC .......... *G06F 3/013* (2013.01); *G02B 27/017* (2013.01); *G02B 27/06* (2013.01); *G06F 3/011* (2013.01); *G06F 3/04815* (2013.01); *G06T 11/60* (2013.01); *G06T 19/006* (2013.01); *G02B 2027/014* (2013.01); *G02B 2027/0187* (2013.01); *G06F 2203/012* (2013.01)

(58) Field of Classification Search
CPC .................................................. G02B 27/017
USPC .......................................................... 345/633
See application file for complete search history.

(56) References Cited

U.S. PATENT DOCUMENTS 10,048,753 B1 * 8/2018 Brooks ................... G06F 3/013

\* cited by examiner

*Primary Examiner* — Javid A Amini
(74) *Attorney, Agent, or Firm* — BrooksGroup

(57) ABSTRACT

A number of illustrative variations may include a method of relative localization via the use of simultaneous location and mapping gear sets.

17 Claims, 3 Drawing Sheets

PERSPECTIVE OR GAZE BASED VISUAL IDENTIFICATION AND LOCATION SYSTEM

CROSS-REFERENCE TO RELATED APPLICATIONS

This application is a continuation of application Ser. No. 15/724,294 filed Oct. 4, 2017 which claims the benefit of the U.S. Provisional Application No. 62/487,564 filed Apr. 20, 2017.

TECHNICAL FIELD

The field to which the disclosure generally relates to includes augmented reality systems.

BACKGROUND

Augmented reality systems technologically augment perception of reality.

SUMMARY OF ILLUSTRATIVE VARIATIONS

A number of illustrative variations may include the use of augmented reality overlays in conjunction with simultaneous location and mapping (SLAM) gear sets to give an augmented reality user a visually intuitive sense of the location of things not limited to objects, locations, or people.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 illustrates a virtual point of interest for an object to be searched for.

DETAILED DESCRIPTION OF ILLUSTRATIVE VARIATIONS

Figure 1:
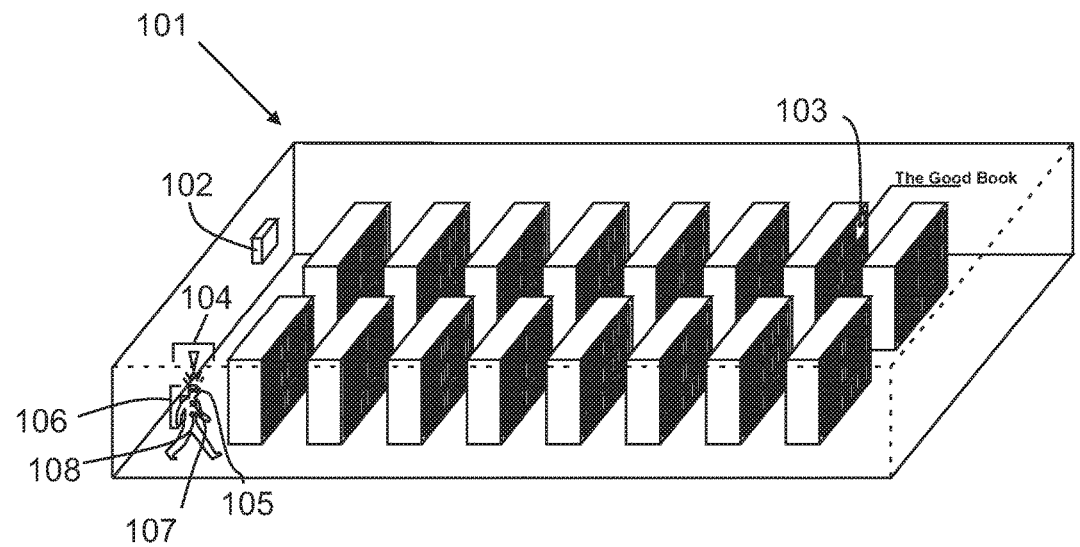
FIG. 1 illustrates a three dimensional map of an area to be searched.

The following description of the variations is merely illustrative in nature and is in no way intended to limit the scope of the invention, its application, or uses.

As used herein, "augmented reality user" may include a "SLAM gear set user." Similarly, "SLAM gear set user," as used herein, may include an "augmented reality user." In addition, "augmented reality system," as used herein, may include at least one "SLAM gear set," and "SLAM gear set" may include at least one "augmented reality system."

In a number of illustrative variations, an augmented reality system may use augmented reality overlays to convey visually intuitive position-related information about a thing, being, or point to be located to an augmented reality user.

In a number of illustrative variations, a SLAM gear set may comprise a transceiver; at least one camera or sensor; a local processing unit; and, an augmented reality display;

In a number of illustrative variations, the augmented reality display may be a display means such as but not limited to a projector and display surface, or an electronic monitor or display. In such illustrative variations, the augmented reality display may be used in conjunction with a first sensor or camera facing a direction that an augmented reality user will sometimes be facing. In such illustrative variations any sensors or cameras may be used selectively, and in concert with software, to dynamically overlay images on a display.

A number of illustrative variations may include detecting an augmented reality user's gaze or perspective via the use of sensors such as but not limited to gyroscopes or accelerometers; providing at least one camera or sensor facing a viewpoint to augmented; using the at least one camera or sensor to collect data, such as but not limited to images, at least partially representative of the viewpoint to be augmented; using a controller to produce viewpoint overlays, in light of the system user's gaze or perspective, which may be displayed in the augmented reality user's line of sight via a display medium; and, displaying the image overlays in the augmented reality user's line of sight via a display medium.

A number of illustrative variations may include detecting an augmented reality user's gaze or perspective via the use of at least one first camera or sensor to collect data regarding the orientation, state, or position of at least the user's face or eyes, and analyzing the data regarding the orientation, state, or position of the augmented reality user's face or eyes to estimate the augmented reality user's gaze or perspective; providing at least one second camera or sensor facing a first viewpoint to be augmented; using the at least one second camera or sensor to collect data, such as but not limited to images, at least partially representative of the first viewpoint to be augmented; using a controller to produce viewpoint overlays, in light of the augmented reality user's gaze or perspective and in light of the data collected by the at least one second camera, which may be displayed in the augmented reality user's line of sight via a display medium; and, displaying the image overlays in the augmented reality user's line of sight via a display medium.

In a number of illustrative variations, stereoscopic data may be collected by using more than one camera or sensor to collect data.

In a number of illustrative variations, data collected by a sensor may be of types including but not limited to optical data, distance data, temperature data, or movement data.

A number of illustrative variations may include detecting an augmented reality user's gaze or perspective via the use of an array of distance sensors, arranged on an apparatus that allows the sensors to move with the augmented reality user's head or eyes, and analyzing the distance data collected by the distance sensors in order to determine the augmented reality user's gaze or perspective, assuming the augmented reality gear set maintains a constant position.

In a number of illustrative variations, a camera facing an augmented reality user may be used to detect or estimate the augmented reality user's gaze or perspective by correlating data including but not limited to the augmented reality user's face orientation, the augmented reality user's distance from the camera or display, the augmented reality user's viewing angle, the augmented reality user's pupil size, the augmented reality user's line of sight, the augmented reality user's eye orientation, or the augmented reality user's eyelid positions.

In a number of illustrative variations, a camera or sensor facing a viewpoint to be augmented may be used in concert with software to detect or estimate the colors, texture, and patterns on the objects in the field of capture of the camera or sensor. In such variations, any augmented reality overlays may be adapted in color or appearance to increase their visibility.

In a number of illustrative variations, a camera facing a direction that an augmented reality user will sometimes be facing may be used in conjunction with a controller to rapidly capture and analyze images. In such illustrative variations analysis may focus on areas of the image that have been determined to be areas in which an image overlay to be displayed may be placed.

In a number of illustrative variations, a first simultaneous location and mapping (SLAM) gear set comprising at least one transceiver and at least one camera or sensor may be used to create a first path map of a first path, traveled by the first SLAM gear set, from a starting point. A transceiver of the SLAM gear set may be used to transmit the first path map to a processing unit and may also send a SLAM gear set identification to the processing unit. The processing unit may analyze any received data and determine the location of the first SLAM gear set user within the first path map. A second SLAM gear set may be used to create a second path map of a second path, traveled by the second SLAM gear set, originating from the same starting point as the first SLAM gear set, or a second path at least intersecting the first path. A transceiver of the second SLAM gear set may also transmit its own, second path map to a processing unit and may also send a second SLAM gear set identification to the processing unit. The processing units receiving data from the first SLAM gear set and the second SLAM gear set may indeed be the same processing unit, but may also be separate entities. A processing unit may analyze any received data and determine the location of the second SLAM gear set user within the second path map. A processing unit may be used to correlate any received path maps, and determine the relative location of at least the second SLAM gear set to at least the first SLAM gear set, and transmit the relative location of at least the second SLAM gear set to at least the first SLAM gear set. The camera(s) or sensor(s) of at least the first SLAM gear set may be used in concert with any number of accelerometers, gyroscopes, or other sensors useful for determining the position and orientation of at least the first SLAM gear set user's gaze or perspective to generate data regarding at least the first SLAM gear set's camera(s') or sensor(s') position(s) or orientation(s). A processing unit may then be used to produce data correlating the relative location of at least the second SLAM gear set to at least the first SLAM gear set to the data regarding at least the first SLAM gear set's camera(s') or sensor(s') position(s) or orientation(s). In such an illustrative variation, at least the first SLAM gear set may be equipped with an augmented reality display. The augmented reality display of at least the first SLAM gear set may then be used to overlay visual data correlating the relative location of at least the second SLAM gear set to at least the first SLAM gear set to the data regarding at least the first SLAM gear set's camera(s') or sensor(s') position(s) or orientation(s) on the first SLAM gear set user's gaze or perspective via at least the first SLAM gear set's augmented reality display.

In a number of illustrative variations, a first simultaneous location and mapping (SLAM) gear set comprising at least one transceiver; at least one camera or sensor; and, at least one local processing unit; may be used to create a first path map of a first path, traveled by the first SLAM gear set, from a starting point. A transceiver of the first SLAM gear set may be used to transmit the first path map to a central processing unit and may also send a first SLAM gear set identification to the central processing unit. The central processing unit may analyze any received data and determine the location of the SLAM gear set user within the first path map. A second SLAM gear set may be used to create a second path map of a second path, traveled by the second SLAM gear set, originating from the same starting point as the first SLAM gear set, or a second path at least intersecting the first path. The transceiver of the second SLAM gear set may also transmit its own, second path map to the central processing unit and may also send a second SLAM gear set identification to the central processing unit. The central processing unit may analyze any received data and determine the location of the second SLAM gear set user within the second path map. The central processing unit may be used to correlate any received path maps, and determine the relative location of at least the second SLAM gear set to at least the first SLAM gear set, and transmit the relative location of at least the second SLAM gear set to at least the first SLAM gear set. The camera(s) or sensor(s) of at least the first SLAM gear set may then be used in concert with any number of accelerometers, gyroscopes, or other sensors useful for determining the position and orientation of at least the first SLAM gear set user's gaze or perspective to generate data regarding at least the first SLAM gear set's camera(s') or sensor(s') position(s) or orientation(s). The local processing unit of at least the first SLAM gear set may then be used to produce data correlating the relative location of at least the second SLAM gear set to at least the first SLAM gear set to the data regarding at least the first SLAM gear set's camera(s') or sensor(s') position(s) or orientation(s). In such illustrative variations, at least the first SLAM gear set may be equipped with an augmented reality display. The augmented reality display of at least the first SLAM gear set may then be used to overlay the data correlating the relative location of at least the second SLAM gear set to at least the first SLAM gear set to the data regarding at least the first SLAM gear set's camera(s') or sensor(s') position(s) or orientation(s) on the first SLAM gear set user's gaze or perspective via at least the first SLAM gear set's augmented reality display.

In a number of illustrative variations, a three-dimensional map of a mapped area may not be a to-scale digital rendering of the area being mapped. For example, if a hallway is being mapped by a SLAM gear set, the three dimensional map of the hallway may not be a to-scale rendering of the hall itself, based upon data collected by the SLAM gear set's camera(s) or sensor(s).

In a number of illustrative variations, creating a path map of any particular path may involve detecting vertical displacement. In such cases, vertical displacement may be detected by the use of any number of accelerometers, altimeter, barometers, gyroscopes, radar, or any other appropriate sensors or devices for such a purpose.

In a number of illustrative variations, it may be useful to reconcile multiple paths of multiple SLAM gear set users. As a non-limiting example, there may be an instance in which the separate paths of two SLAM gear set users should be level with each other within a comprehensive map, but are not level. A processing unit may reconcile these paths in any suitable way, such as but not limited to comparative image analysis and reconciliation of meta data, or by fitting the path data and path map to blueprint data or topographical data.

In some illustrative variations, the method of determining the relative positions of SLAM gear sets may involve a determination of a SLAM gear set's distance from an absolute reference point or some shared reference point other than a shared starting point.

In a number of illustrative variations, a SLAM gear set may be the most rudimentary implementation of a SLAM gear set that may be used to track a SLAM gear set's position as the SLAM gear set moves about while traversing an area.

In a number of illustrative variations, a SLAM gear set's position may be determined via the exclusive use, combined use, or supplemental use of global positioning methods such as but not limited to the use of a Global Positioning System (GPS) or cell tower triangulation. In such illustrative variations, the SLAM gear set's global or absolute position may be used in determining the SLAM gear set's relative position.

In a number of illustrative variations, an augmented reality display may be selectively caused to exclude or include certain data from being overlaid on the augmented reality display. The selection of what to display and what not to display may be achieved by any suitable means such as but not limited to the use of controls in a software application that is configured to communicate with any processing system(s).

In a number of illustrative variations, a map used by or produced by an augmented reality system may not be three-dimensional.

In a number of illustrative variations, a map used by any processing system or augmented reality system may be pre-rendered.

In a number of illustrative variations, a path map may be created using any SLAM algorithm and suitable sensor(s) or camera(s) available. Some SLAM algorithms allow for the use of only one camera or light sensor, while some call for a camera and a laser, or an array of lasers or distance sensors, still other SLAM algorithms use any number of other sensors such as but not limited to gyroscopes or accelerometers. The use of any sensors or cameras necessary for any SLAM algorithm that creates a three-dimensional map from sensor or camera data is suitable for the disclosed method.

In a number of illustrative variations, visual overlays may be used to augment a SLAM gear set user's perception by interposing the overlays between the SLAM gear set user's viewpoint and any potential focal point of the SLAM gear set user's gaze or perspective on a transparent medium such as a window or the windshield via some suitable display method such as projection. The visual overlays may also be interposed between the SLAM gear set user and any potential focal point of the SLAM gear set user's gaze or perspective via some non-transparent medium such as a display screen.

In a number of illustrative variations, a SLAM gear set user may create or remove points of interest within a map of an area being traversed or mapped. In such illustrative variations, a SLAM gear set user may be able to select which points of interest, within the map, that it wishes to appear on its augmented reality display when traversing the mapped area. Points of interest may also be automatically generated within the map or self-identifying based on technologies such as but not limited to (Radio-Frequency Identification) RFID, Bluetooth, or wireless internet.

In a number of illustrative variations, points of interest may be attached to a movable thing. In such illustrative variations, if a system is in place to detect that the movable thing to which the point of interest is attached has moved, a notice may be generated that the location of the movable thing has changed, and that point of interest must be updated by a user. As a non-limiting example in the context of a library, if a point of interest is associated with a particular book via meta data, and an RFID tag is placed in such book and associated with the book, any time an individual removes the tagged book from the shelf in which the tagged book was placed the tag within the book may be sensed by a shelf-end RFID sensor, indicating that the tagged book associated with the point of interest has been moved from its original position. The RFID sensor reading may then be used by a processing unit to determine that the tagged book, on which the point of interest was placed, has been moved, and a notice that the point of interest should be updated by a SLAM gear set user such as a librarian may be generated.

In a number of illustrative variations, the display means may dynamically change the color, arrangement, pattern, shape, or format of the visual overlays displayed.

In a number of illustrative variations, the SLAM gear set may be used in combination with any number of methods to reduce mapping anomalies as a result of particulates, liquids, or partially translucent or partially opaque objects, things or phenomenon such as but not limited to frosted glass, airborne dust, fire, smoke, rain, or fog. The SLAM gear set may use hardware dedicated particularly for this purpose. Any processing unit may also aide in reducing such anomalies by any number of suitable means.

In a number of illustrative variations, the display means may be worn by a SLAM gear set user. Such display means may include but are not limited to transparent face wear such as glasses or a visor. In a number of variations, the display may be worn by a SLAM gear set user but may not be transparent. Examples include but are not limited to a mask that fits over the bridge of the nose and contains one or more electronic screens held in front of the eyes.

In a number of illustrative variations, a central processing unit may be worn by a SLAM gear set user or another individual, or carried by a vehicle or any other thing with the ability to move.

Referring now to the illustrative variation shown in FIG. 1, a three dimensional map 101 of an area may exist in memory for a central processing unit 102. In such a variation, certain portions of the three dimensional map may be marked as points of interest 103. The points of interest may be labeled, and any SLAM gear set user 104 traversing the area of the three dimensional map may see the point of interest 103 displayed on their augmented reality display 105. For example, if a three dimensional map 101 of a library is initially created using one of a SLAM gear set 106, and each shelved book is marked and labeled as a point of interest by a SLAM gear set user 104, or is an automatically generated or self-identifying point of interest, a subsequent SLAM gear set user may simply select a point of interest 103 he or she seeks (for example: the point of interest "The Good Book"), and scan the SLAM gear set's 106 camera(s) 107 or sensor(s) 108 around the library to cause the SLAM gear set's 106 augmented reality display 105 to show the selected point of interest's 103 position in the library, relative to the SLAM gear set user's 104 position, in a visually intuitive manner.

Figure 2:
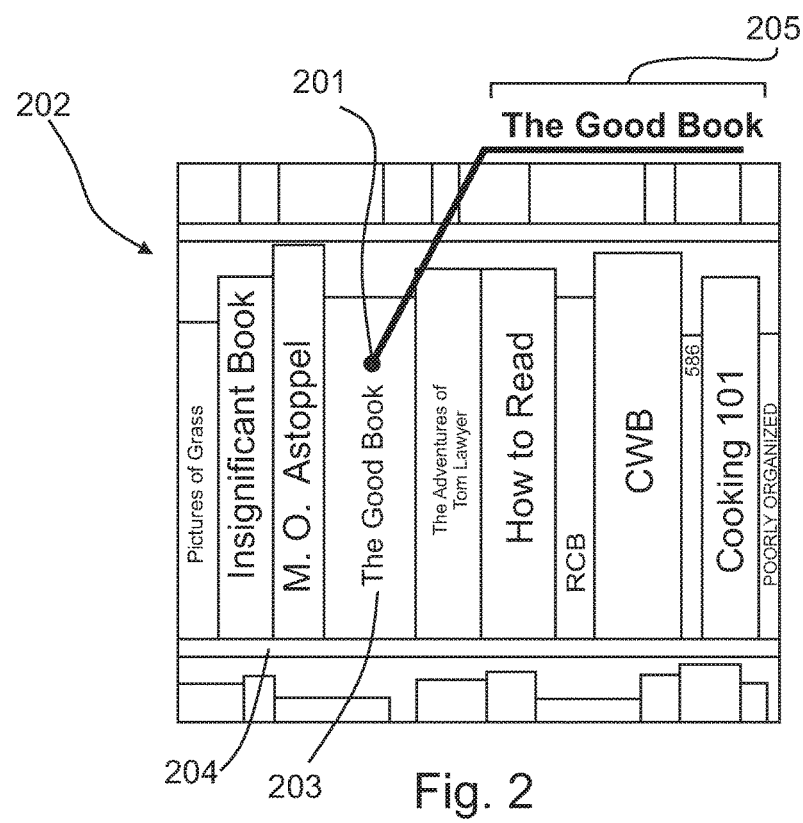

Referring now to the illustrative variation shown in FIG. 2, a point of interest 201 may be set and observed with precision, based upon the perspective or gaze 202 of a SLAM gear set user. For example, a first SLAM gear set user may place a particular book 203 on a particular shelf 204 and set a point of interest 201 on that particular book 203 by using the perspective-informed modeling and localizing technology of the SLAM gear set. In such an illustrative variation, the SLAM gear set may be equipped with any number of sensors or cameras that allow the SLAM gear set to detect with fair accuracy the precise point at which the SLAM gear set user is looking when the SLAM gear set user indicates to the SLAM gear set that he or she wishes to place a point of interest 201 on the object that is the focus of the SLAM gear set user's gaze or perspective. The SLAM gear set user may also create a label 205 for the newly created point of interest. Data such as but not limited to depth data, position data, perspective data, and focus data may then be processed by the SLAM gear set itself, and represented in any map data, or transmitted via a transceiver of the SLAM gear set to a central processing unit along with any relevant path map data. If the central processing unit is used for compiling a map of the path being traversed by the SLAM gear set user, the central processing unit may include the point of interest data in the map data for the path being traversed by the SLAM gear set user.

Figure 3:
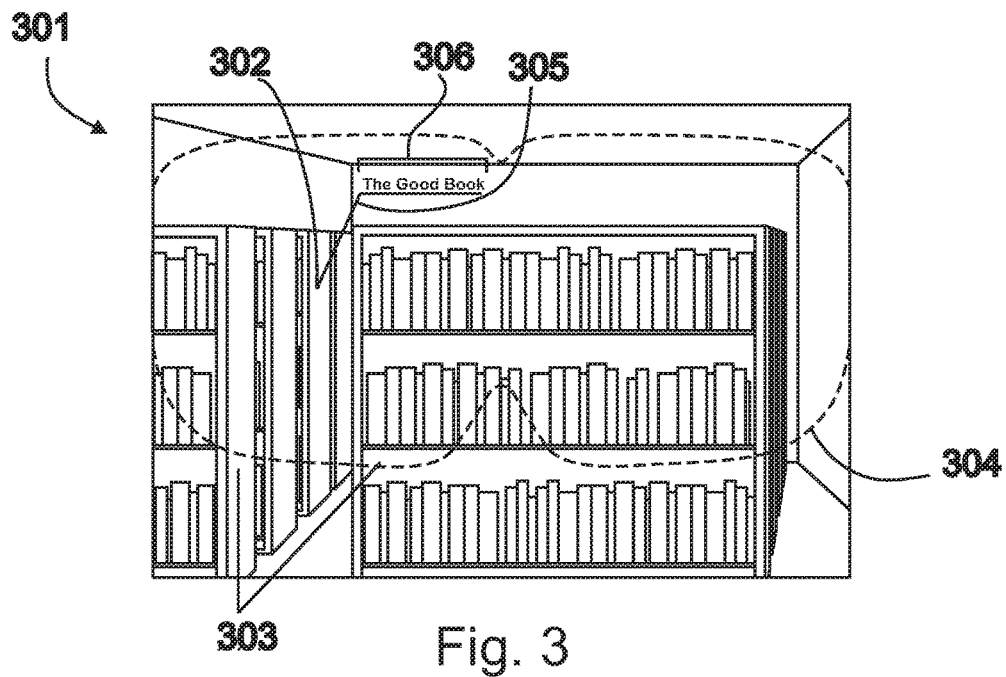
FIG. 3 illustrates a SLAM gear set user's perspective when visually scanning for a virtual waypoint.

Referring now to the illustrative variation shown in FIG. 3, a slam gear set user's perspective or gaze 301 is shown. A SLAM gear set user may be able to see a point of interest 302 in the distance, through any visual obstacles 303 that may obstruct the SLAM gear set user's vision. As the SLAM gear set user's perspective or gaze 301 moves about the area in which the point of interest 302 resides, a stationary point of interest 302 will stay stationary with respect to the SLAM gear set user. As the SLAM gear set user approaches the point of interest 302, the SLAM gear set user's augmented reality display 304 may re-render the visual overlay 305 or label 306 for the point of interest 302 in real time and in a manner that indicates in a visually intuitive way that the SLAM gear set user is approaching the point of interest 302. For example, if the augmented reality display 304 is of a stereoscopic form (offering individual display mediums for each eye), the augmented reality display 304 may stereoscopically increase the size of the visual overlay 305 or label 306 for the point of interest 302 for each of the SLAM gear user's eyes and individual display mediums as the SLAM gear set user approaches the point of interest 302, thereby giving the SLAM gear set user a visually intuitive sense of depth regarding the point of interest's 302 distance from the SLAM gear set user.

Figure 4:
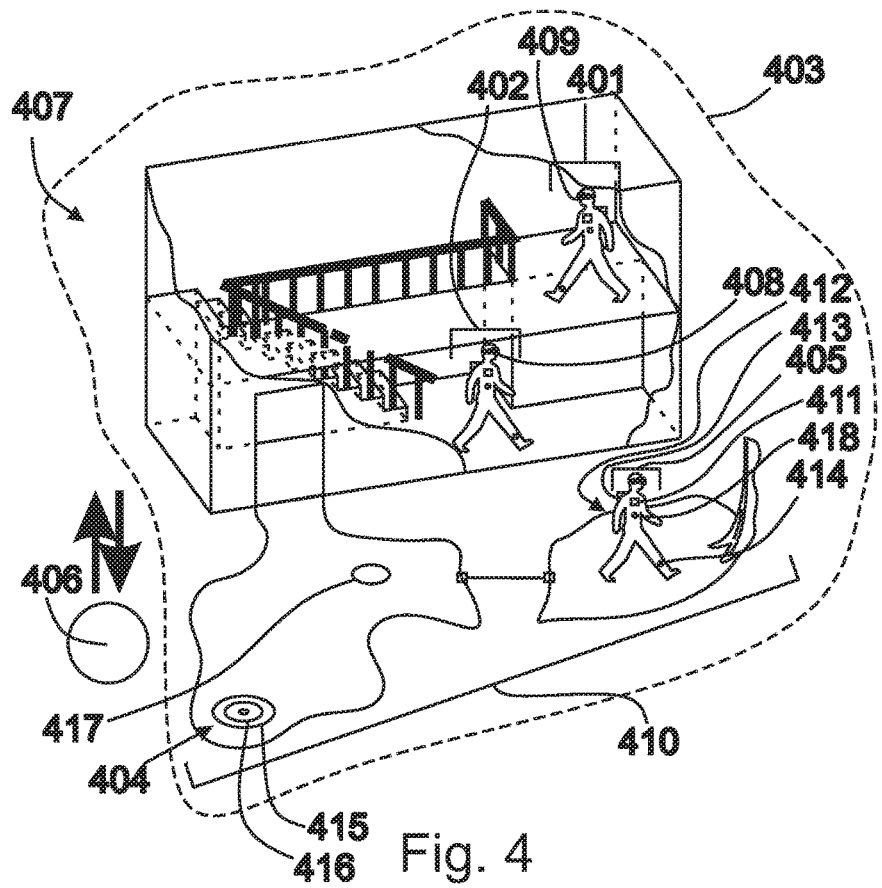
FIG. 4 illustrates a partially-completed three dimensional map of an area to be searched, as produced in real time by two or more SLAM gear set users.

Referring now to the illustrative variation shown in FIG. 4, any number of SLAM gear set users, including but not limited to a first SLAM gear set user 401 and a second SLAM gear set user 402 may commence scanning an area 403 from any number of locations. A first SLAM gear set user 401 may commence scanning an area from a first starting location 415, a second SLAM gear set user 402 may commence scanning the same area 403 from a second starting location 416 or from a shared starting location 404. In the illustrative variation shown in FIG. 4, a third SLAM gear set user 405 may also commence scanning the same area 403 from a third starting location 417, or the shared starting location 404. Each SLAM gear set may compile fragments of a three dimensional map of the area 403 being mapped, and may transmit those fragments to a central processing unit 406 periodically or in real time. The central processing unit 406 may thus compile a comprehensive three dimensional map 407 from any number of path maps or path map fragments from any number of SLAM gear sets. In such an illustrative variation, the central processing unit 406 need not determine the absolute position of the first SLAM gear set user 401, second SLAM gear set user 402, or the third SLAM gear set user 405, but only each user's position relative to one another within the comprehensive three dimensional map 407, which may be translated to relative locations in the real world. If the third SLAM gear set user 405 traverses an outdoor location 410, any camera(s) 411 or sensor(s) 418 comprising the third SLAM gear set 412 that collect data generally based upon the third SLAM gear set user's 405 perspective or gaze may not be capable of collecting data that clearly indicates the third SLAM gear set user's 405 path, due to a lack of walls and ceilings outdoors. In this case, a different source of path data (such as but not limited to a GPS unit 411 or pedometer 414) may be deferred to, in order to allow the central processing unit 406 or the local processing unit 413 of the third SLAM gear set 412 to estimate or detect the third SLAM gear set user's 405 path. Additionally, if the central processing unit 406 is able to determine how far the first SLAM gear set user 401 has traveled as well as the particular path of the first SLAM gear set user 401, the central processing unit 406 may determine the first SLAM gear set user's 401 distance and direction from some reference point, such as the shared starting point 404. The central processing unit 406 may use such data to determine at least the second SLAM gear set user's 402 distance and direction from the same reference point. From this or other pertinent calculations or measurements, the central processing unit 406 may then determine the directional distance between at least the first SLAM gear set user 401, and the second SLAM gear set user 402. Having determined the directional distance between the first SLAM gear set user 401 and the second SLAM gear set user 402, the central processing unit 406 may then calculate and transmit perspective-based data regarding the second SLAM gear set user's 402 position relative to the first SLAM gear set user 401, as well as the first SLAM gear set user's 401 relative position to the second SLAM gear set user 402. An augmented reality display of the first SLAM gear set 409 may display to the first SLAM gear set user 401 information regarding the relative position of the second SLAM gear set user 402. Likewise, an augmented reality display of the second SLAM gear set 408 may display to the second SLAM gear set user 402 information regarding the relative position of the first SLAM gear set user 401. In such an illustrative variation, the information displayed on any SLAM gear set user's augmented reality display may change based upon that SLAM gear set user's perspective.

Figure 5:
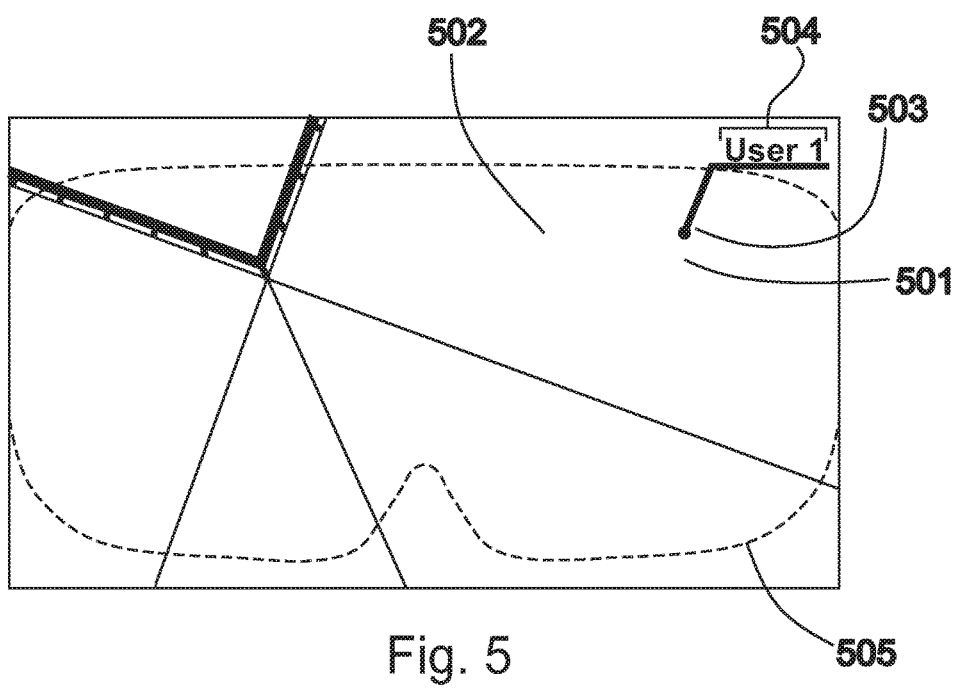
FIG. 5 illustrates a SLAM gear set user's perspective when visually scanning for the relative location of another SLAM gear set user.

Referring now to the illustrative variation shown in FIG. 5, a potential perspective of the second SLAM gear set user 402 from FIG. 4 is shown. A SLAM gear set user may simply peer around itself in order to receive visually intuitive information regarding the relative position of some other point of interest 501 via an augmented reality display 505. In the illustrative variation shown in FIG. 5, the SLAM gear set user is looking up at ceiling 502. Even though the ceiling occludes clear sight of the point of interest 501, the augmented reality display 505 of the SLAM gear set user has overlaid a visually intuitive overlay 503 and label 504 for the point of interest 501 upon the SLAM gear set user's perspective. In this way the SLAM gear set user may determine the identity, relative direction and distance of the point of interest 501, even through a visually occlusive obstacle.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising:
providing a first simultaneous location and mapping (SLAM) gear set comprising: a mapping system; a user-perspective determination system; at least one transceiver; an augmented reality display medium; and, at least one local processing unit.

Variation 2 may include the method of variation 1, further comprising:
providing a second SLAM gear set comprising: a mapping system; a user-perspective determination system; at least one transceiver; an augmented reality display medium; and, at least one local processing unit;
providing a central processing unit comprising at least one transceiver;
using at least the first SLAM gear set to create a first path map of a first path from a first starting point;
using at least the second SLAM gear set to create a second path map of a second path from a second starting point;
using the at least one transceiver of at least the first SLAM gear set to transmit the first path map to the central processing unit;
using the at least one transceiver of at least the second SLAM gear set to transmit the second path map to the central processing unit;
using the central processing unit to correlate the first path map to the second path map, to determine a relative location of at least the second SLAM gear set to at least the first SLAM gear set.

Variation 3 may include the method of variation 2 wherein the method further comprises using the transceiver of the central processing unit to transmit the relative location of at least the second SLAM gear set to at least the first SLAM gear set.

Variation 4 may include the method of variation 1 wherein the method further comprises using the mapping system of the first SLAM gear set, in concert with the user-perspective determination system of the first SLAM gear set to produce data regarding at least the first SLAM gear set's mapping system's position and orientation and a first SLAM gear set user's perspective.

Variation 5 may include the method of variation 3 wherein the method further comprises using the at least one local processing unit of at least the first SLAM gear set to produce visual data correlating the relative location of at least the second SLAM gear set to at least the first SLAM gear set to the data regarding at least the first SLAM gear set's mapping system's position and orientation and to the first SLAM gear set user's perspective; and,
using the augmented reality display medium of at least the first SLAM gear set to display the visual data correlating the relative location of at least the second SLAM gear set to at least the first SLAM gear set to the data regarding at least the first SLAM gear set's mapping system's position and orientation and to the first SLAM gear set user's perspective.

Variation 6 may include the method of variation 2 wherein at least the first path map is three-dimensional.

Variation 7 may include the method of variation 2 wherein the first starting point and the second starting point are the same geographical point.

Variation 8 may include the method of variation 2 wherein determining the relative location of at least the second SLAM gear set to at least the first SLAM gear set further comprises the use of GPS or cell tower triangulation.

Variation 9 may include a method comprising:
providing a map of an area to be traversed, comprising at least one point of interest;
providing a first simultaneous location and mapping (SLAM) gear set comprising: a mapping system; a user-perspective determination system; at least one transceiver; an augmented reality display medium; and, at least one local processing unit.

Variation 10 may include the method of variation 9 wherein the method further comprises providing a central processing unit comprising at least a transceiver;
using the SLAM gear set to create a path map originating from a starting point; using the transceiver of the SLAM gear set to transmit the path map to the central processing unit;
using the central processing unit to produce relative location data by correlating the path of the SLAM gear set to the point of interest.

Variation 11 may include the method of variation 10 wherein the method further comprises using the transceiver of the central processing unit to transmit the relative location data and the at least one point of interest to the SLAM gear set;
using the mapping system of the SLAM gear set, in concert with the user-perspective determination system of the SLAM gear set to generate data regarding the SLAM gear set's mapping system's position and orientation and a SLAM gear set user's perspective;
using the at least one local processing unit of the SLAM gear set to produce visual data correlating the relative location of the SLAM gear set to the at least one point of interest to the data regarding the SLAM gear set's mapping system's position and orientation and to the SLAM gear set user's perspective.

Variation 12 may include the method of variation 11 wherein the method further comprises using the augmented reality display medium to overlay the visual data correlating the relative location of the SLAM gear set to the at least one point of interest and the data regarding at least the first SLAM gear set's mapping system's position and orientation and to the SLAM gear set user's perspective.

Variation 13 may include the method of variation 9 wherein the mapping system of the SLAM gear set has the ability to create three-dimensional maps.

Variation 14 may include the method of variation 9 wherein the SLAM gear set is used to change, create, or delete the at least one point of interest.

Variation 15 may include the method of variation 9 wherein the at least one point of interest is automatically generated.

Variation 16 may include the method of variation 9 wherein the method further comprises providing a central processing unit; and, using the at least one local processing unit of the SLAM gear set or the central processing unit to cause the at least one point of interest to be included or disregarded in the process of producing visual data correlating the relative location of the SLAM gear set to the at least one point of interest to the data regarding the SLAM gear set's mapping system's position and orientation and to the SLAM gear set user's perspective.

Variation 17 may include a method comprising: providing a first simultaneous location and mapping (SLAM) gear set comprising: a mapping system; and, a user-perspective determination system.

Variation 18 may include the method of variation 17, further comprising:

providing a second SLAM gear set comprising: A mapping system; and, a user-perspective determination system;

using at least the first SLAM gear set to create a first path map of a first path from a first starting point;

using at least the second SLAM gear set to create a second path map of a second path from a second starting point;

correlating the first path map to the second path map, to determine a relative location of at least the second SLAM gear set to at least the first SLAM gear set;

using the mapping system of the first SLAM gear set, in concert with the user-perspective determination system of the first SLAM gear set to produce data regarding at least the first SLAM gear set's mapping system's position and orientation and a first SLAM gear set user's perspective;

correlating the relative location of at least the second SLAM gear set to at least the first SLAM gear set to the data regarding at least the first SLAM gear set's mapping system's position and orientation and to the first SLAM gear set user's perspective; and, displaying the visual data correlating the relative location of at least the second SLAM gear set to at least the first SLAM gear set to the data regarding at least the first SLAM gear set's mapping system's position and orientation and to the first SLAM gear set user's perspective via a suitable means of display.

The above description of select variations within the scope of the invention is merely illustrative in nature and, thus, variations or variants thereof are not to be regarded as a departure from the spirit and scope of the invention.

What is claimed is:

1. A method comprising:
providing a first simultaneous location and mapping (SLAM) gear set comprising: a mapping system; and, a user-perspective determination system;
providing a second SLAM gear set comprising: a mapping system; and,
a SLAM-gear-set-perspective determination system;
using at least the first SLAM gear set to create a first path map of a first path from a first starting point;
using at least the second SLAM gear set to create a second path map of a second path from a second starting point;
correlating the first path map to the second path map, to determine a relative location of at least the second SLAM gear set to at least the first SLAM gear set.

2. The method of claim 1 further comprising using the mapping system of the first SLAM gear set, in concert with the SLAM-gear-set-perspective determination system of the first SLAM gear set to produce data regarding at least the first SLAM gear set's mapping system's position and orientation and a first SLAM gear set's perspective.

3. The method of claim 2 further comprising:
producing visual data correlating the relative location of at least the second SLAM gear set to at least the first SLAM gear set to the data regarding at least the first SLAM gear set's mapping system's position and orientation and to the first SLAM gear set's perspective; and,
displaying the visual data via a means of display.

4. The method of claim 1, wherein the first SLAM gear set is not worn by a SLAM gear set user.

5. The method of claim 1, wherein the first SLAM gear set is carried by a vehicle.

6. The method of claim 3, wherein the means of display is in a location remote from the first SLAM gear set.

7. The method of claim 1 wherein the first starting point and the second starting point are the same geographical point.

8. The method of claim 1 wherein at least the first path map is three-dimensional.

9. The method of claim 1 wherein determining the relative location of at least the second SLAM gear set to at least the first SLAM gear set further comprises the use of GPS or cell tower triangulation.

10. The method of claim 1 wherein the first SLAM gear set comprises a handheld electronic device.

11. The method of claim 10 wherein the handheld electronic device comprises a mobile phone.

12. The method of claim 5 wherein the first SLAM gear set is carried by a vehicle in that the SLAM gear set comprises the vehicle electronics.

13. A method comprising:
providing a first simultaneous location and mapping (SLAM) gear set comprising: a mapping system; a user-perspective determination system; at least one transceiver; an augmented reality display medium; and, at least one local processing unit;
providing a central processing unit comprising at least one transceiver;
using at least the first SLAM gear set to create a first path map of a first path from a first starting point;
using the at least one transceiver of at least the first SLAM gear set to transmit the first path map to the central processing unit; and,
using the central processing unit to correlate a second path map of a second path from a second starting point to the first path map, to determine a relative location of at least the first SLAM gear set to a point on the second path map.

14. The method of claim 13 wherein the point on the second path map is the location of a second SLAM gear set.

15. The method of claim 13 wherein the first starting point and the second starting point are the same geographical point.

16. The method of claim 13 wherein determining the relative location of at least the first SLAM gear set to the point on the second path map further comprises the use of GPS or cell tower triangulation.

17. The method of claim 13 further comprising:
using the mapping system of the first SLAM gear set, in concert with the SLAM-gear-set-perspective determination system of the first SLAM gear set to produce data regarding at least the first SLAM gear set's mapping system's position and orientation and a first SLAM gear set's perspective; and,
producing visual data correlating the relative location of at least the first SLAM gear set to at least the point on the second path map to the data regarding at least the first SLAM gear set's mapping system's position and orientation and to the first SLAM gear set's perspective; and,
displaying the visual data via a means of display.

* * * * *